US008341446B2

(12) United States Patent
Wang et al.

(10) Patent No.: US 8,341,446 B2
(45) Date of Patent: Dec. 25, 2012

(54) CONTROL MODULE FOR CONTROLLING ELECTRO-PHORETIC DISPLAY INTEGRATED CIRCUIT AND METHOD THEREOF

(75) Inventors: Mei-Shu Wang, Hsinchu County (TW); Liao-Shun Cheng, Ping-Tung County (TW)

(73) Assignee: Princeton Technology Corporation, New Taipei (TW)

( * ) Notice: Subject to any disclaimer, the term of this patent is extended or adjusted under 35 U.S.C. 154(b) by 329 days.

(21) Appl. No.: 12/884,168

(22) Filed: Sep. 16, 2010

(65) Prior Publication Data

US 2011/0090003 A1 Apr. 21, 2011

(30) Foreign Application Priority Data

Oct. 21, 2009 (TW) ............................... 98135563 A

(51) Int. Cl.
*G06F 1/32* (2006.01)

(52) U.S. Cl. ......................... 713/324; 235/492; 327/544

(58) Field of Classification Search .................. 235/492; 327/544; 713/324
See application file for complete search history.

(56) References Cited

U.S. PATENT DOCUMENTS 8,011,592 B2 * 9/2011 Wang ............................ 235/492
8,179,111 B2 * 5/2012 Akyildiz et al. .............. 323/283
2009/0201082 A1 * 8/2009 Smith et al. ................... 327/544

* cited by examiner

*Primary Examiner* — Albert Wang
(74) *Attorney, Agent, or Firm* — Winston Hsu; Scott Margo

(57) ABSTRACT

By classifying an electro-phoretic display integrated circuit (EPD IC) into a digital routine module, a digital non-routine module, and an analog routine module, and by switching off the digital non-routine module and the analog routine module, power consumption of the EPD IC may be effectively reduced, and an available time of an integrated circuit card utilizing the EPD IC may also be lengthened.

9 Claims, 6 Drawing Sheets

CONTROL MODULE FOR CONTROLLING ELECTRO-PHORETIC DISPLAY INTEGRATED CIRCUIT AND METHOD THEREOF

BACKGROUND OF THE INVENTION

1. Field of the Invention

The present invention discloses a control module for controlling an electro-phoretic display integrated circuit (EPD IC) and a method thereof, and more particularly, to a control module for controlling an EPD IC to reduce power consumption.

2. Description of the Prior Art

There are certain integrated circuit card (IC card) utilizing an EPD IC, for example, a smart card. The EPD IC is used for displaying important messages to inform a user of the IC card. A built-in battery of the IC card is always required to provide power for EPD IC, therefore, power consumption of the EPD IC has to be reduced as more as possible, so as to lengthen a life cycle of the IC card.

While the IC card is scanned by an external detector, the utilized EPD IC has to be activated to display information. Therefore, at other conditions, the EPD IC is not required to be activated so that said EPD IC enters a sleep mode for reducing its power consumption. A conventional IC card consumes a current of 0.5-2 μA under the sleep mode, however, there is merely a current of 7 mA per hour provided by the built-in battery. As a result, a life cycle of the IC card may not be long. Therefore, there is a need of reducing power consumption of the EPD IC for lengthening the life cycle of said IC card.

SUMMARY OF THE INVENTION

The claimed invention discloses a control module for controlling an electro-phoretic display integrated circuit (EPD IC). The control module comprises a digital routine module, a digital non-routine module, an analog module, and a switch module. The digital routine module is used for operating a plurality of digital routine modules of an EPD IC. The digital non-routine module is used for operating a plurality of digital non-routine modules of the EPD IC. The analog module is used for operating a plurality of analog modules of the EPD IC. The switch module is used for determining whether to switch off the digital routine module or the analog module according to whether a sleep mode of the EPD IC is activated.

The claimed invention also discloses a method of controlling an EPD IC. The method comprises switching on a digital non-routine module, a real-time counting module, and an analog module, for entering a normal mode of an EPD IC; confirming whether the EPD IC is at a sleep mode or a shut-down mode before entering the normal mode; restoring the normal mode of the EPD IC according to a result of the confirming; and switching off the digital non-routine module, the real-time counting module, and the analog module, for entering the sleep mode of the EPD IC, and waiting for an interrupt message to exit the sleep mode.

These and other objectives of the present invention will no doubt become obvious to those of ordinary skill in the art after reading the following detailed description of the preferred embodiment that is illustrated in the various figures and drawings.

DETAILED DESCRIPTION

For reducing power consumption of the EPD IC utilized by the IC card under the sleep mode, a control module for controlling the EPD IC and a related method are disclosed in the present invention.

Figure 1:
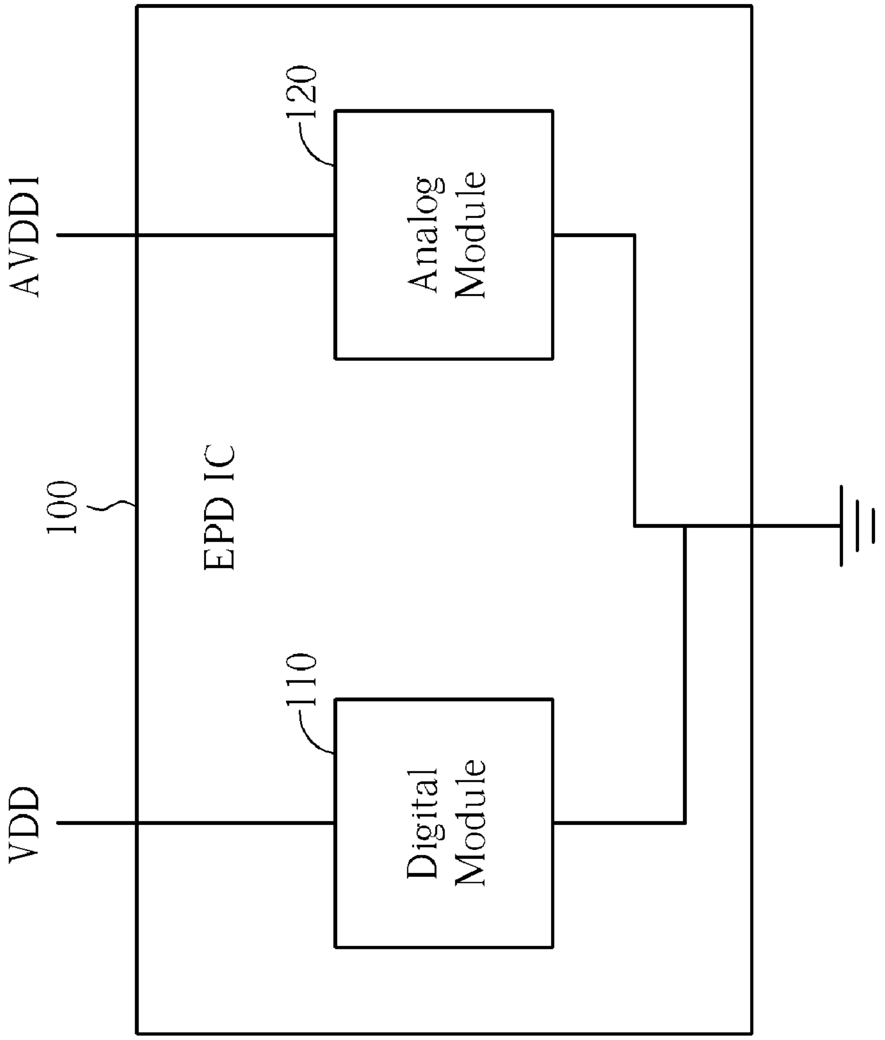
FIG. 1 is a schematic diagram of a conventional EPD IC.

For describing how the disclosed control module of the present invention is implemented, a basic structure of an EPD IC is introduced in advance. Please refer to FIG. 1, which is a schematic diagram of an EPD IC 100. As shown in FIG. 1, the EPD IC 100 includes a digital module 110 and an analog module 120. The digital module 110 primarily includes digital elements of the EPD IC 100 for processing digital operations of the EPD IC 100, where the digital elements may include, but not limited to, a microprocessor, a memory, a real-time counter, and a bus interface. The analog module 120 includes analog elements of the EPD IC 100 for processing analog operations of the EPD IC 100, where the analog elements may include, but not limited to, a digital-controlled oscillator phase-locked loop (DCO PLL), a temperature sensor, an analog-to-digital converter, and a charge pump. The cooperation between the digital elements and the analog elements is further described later. Note that the digital module 110 is provided with power by a first DC source VDD, and the analog module 120 is provided with power by a second DC source AVDD1.

Figure 2:
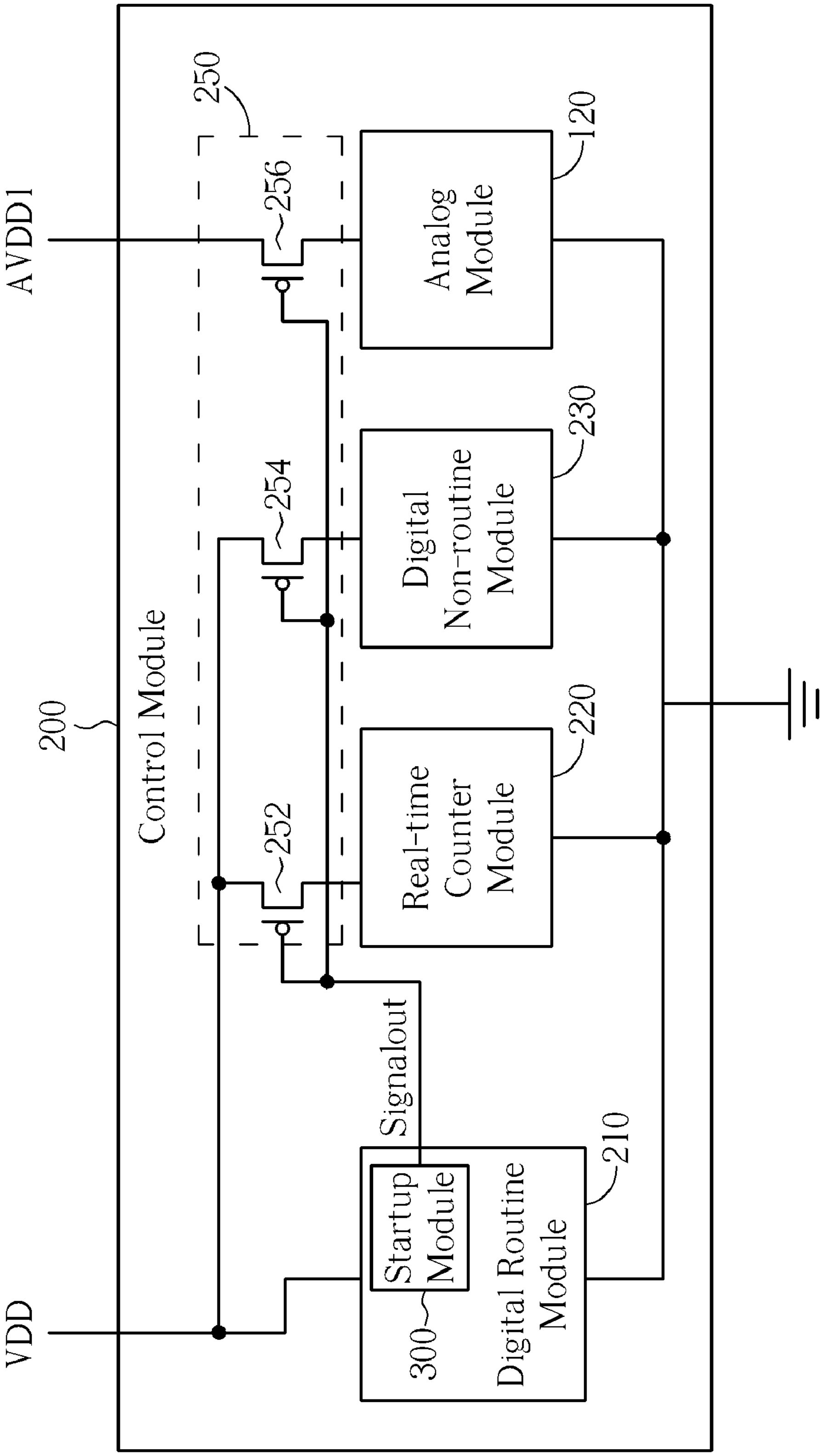
FIG. 2 is a schematic diagram of a control module for controlling the EPD IC shown in FIG. 1.

Please refer to FIG. 2, which is a schematic diagram of a control module 200 for controlling the EPD IC 100 shown in FIG. 1. As shown in FIG. 2, the control module 200 includes a digital routine module 210, a real-time counter module 220, a digital non-routine module 230, the analog module 120, and a switch module 250. Note that elements of the digital module 110 shown in FIG. 1 are respectively classified into a plurality of blocks. For example, among operations of the EPD IC 100, a first part of digital operations have to be maintained as routines under a sleep mode, so that elements related to the first part of digital operations are classified to be included by the digital routine module 210; whereas a second part of digital operations may be relieved from being activated under the sleep mode, so that elements related to the second part of digital operations may be classified to be included by the digital non-routine module 230 or the real-time counter module 220. The switch module 250 includes a first switch 252, a second switch 254, and a third switch 256. The first switch 252 is used for switching on or switching off the real-time counter module 220. The second switch 254 is used for switching on or switching off the digital non-routine module 230. The third switch 256 is used for switching on or switching off the analog module 120. The digital routine module 210 further includes a startup module 300, for generating an output signal Signalout to switch on or off the switches 252, 254, and 256, so as to switch on or off the real-time counter module 220, the digital non-routine module 230, and the analog routine module 120, while the EPD IC 100 enters or leaves the sleep mode. In a preferred embodiment of the present invention, the switches 252, 254, and 256 are implemented by metal oxide semiconductors.

Operations of the control module 200 are briefly described as follows. While the EPD IC 100 enters the sleep mode, the output signal Signalout from the startup module 300 is configured to switch off the switches 252, 254, and 256; so that the real-time counter module 220 and the digital non-routine module 230 are isolated from the DC source VDD, the analog module 120 is isolated from the DC source AVDD1 as well, and the aim of reducing power consumption is fulfilled as a result. Note that at this time, power consumption is merely generated by the digital routine module 210 within the control module 200. While the EPD IC 100 leaves the sleep mode and enters a normal mode because of being scanned, the output signal Signalout from the startup module 300 is configured to switch on the switches 252, 254, and 256, so that the real-time counter module 220 and the digital non-routine module 230 are switched on by power supply from the DC source VDD, and the analog module 120 is switched on by power supply from the DC source AVDD1.

Note that while both the digital module 110 and the analog module 120 shown in FIG. 1 are used for implementing the control module 200 shown in FIG. 2, there are no physical amendment on the structure of both the digital module 110 and the analog module 120; moreover, the digital module 110 is merely segmented into a routine block and a non-routine block, and the switch module 250 is attached to the digital module 110 for controlling activate statuses of the blocks. Therefore, as a matter of fact, the control module 200 includes primary elements of the EPD IC 100, i.e., the digital module 110 and the analog module 120, where the digital routine module 210, the real-time counter module 220, and the digital non-routine module 230 together indicate the part of the digital module 110 included by the control module 200. Note that not all elements included by the digital routine 210 are included by the EPD IC 100. According to the above descriptions, since the control module 200 of the present invention does not introduce any physical amendments in elements included by the EPD IC 100, instead, the control module 200 introduces improvements in switch structure according to the original structure of the EPD IC 100, the control module 200 does not introduce burdens in design complexity or circuit area.

Figure 3:
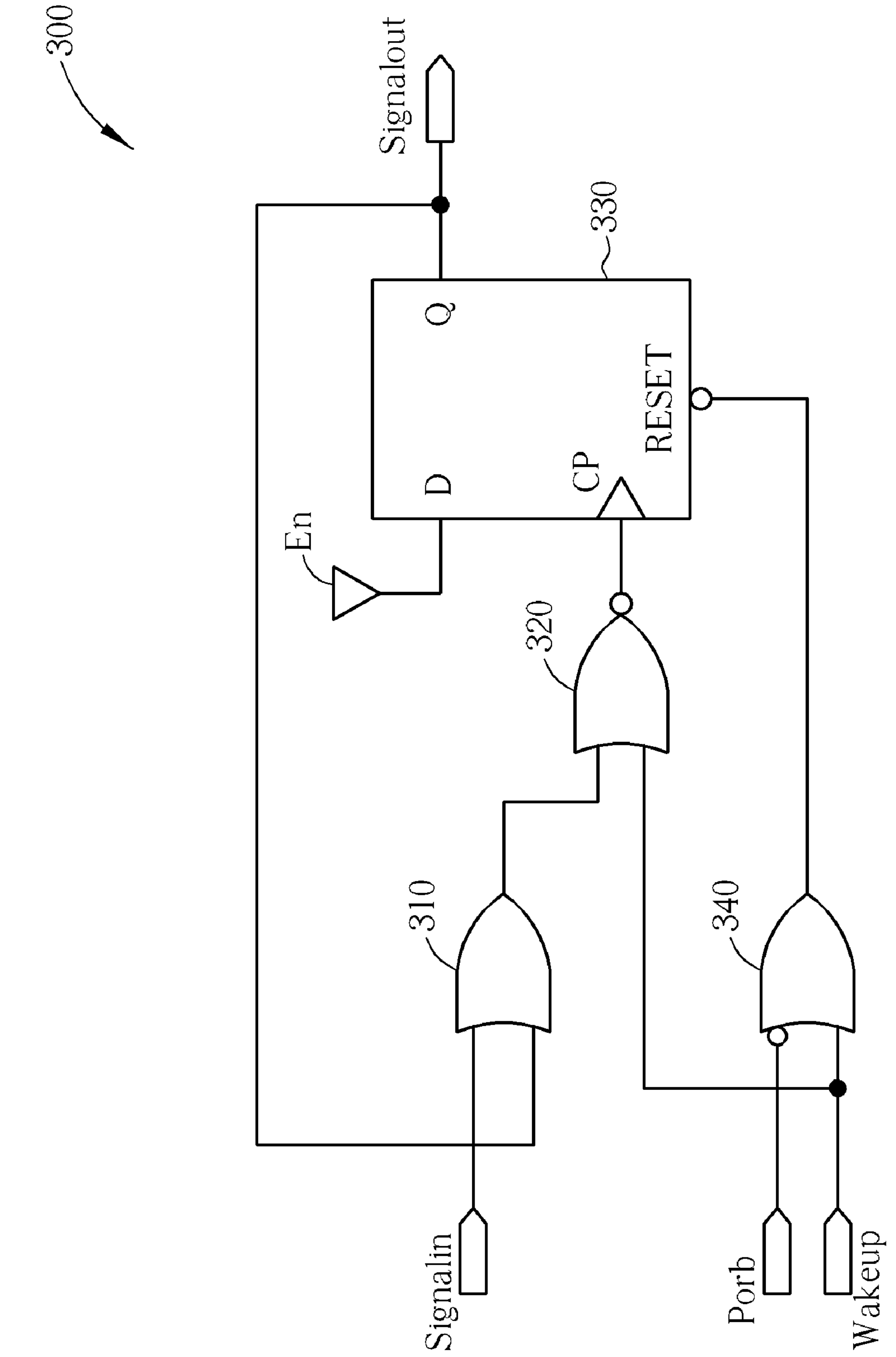
FIG. 3 illustrates a detailed diagram of the startup module shown in FIG. 2 according to a preferred embodiment of the present invention.
Figure 4:
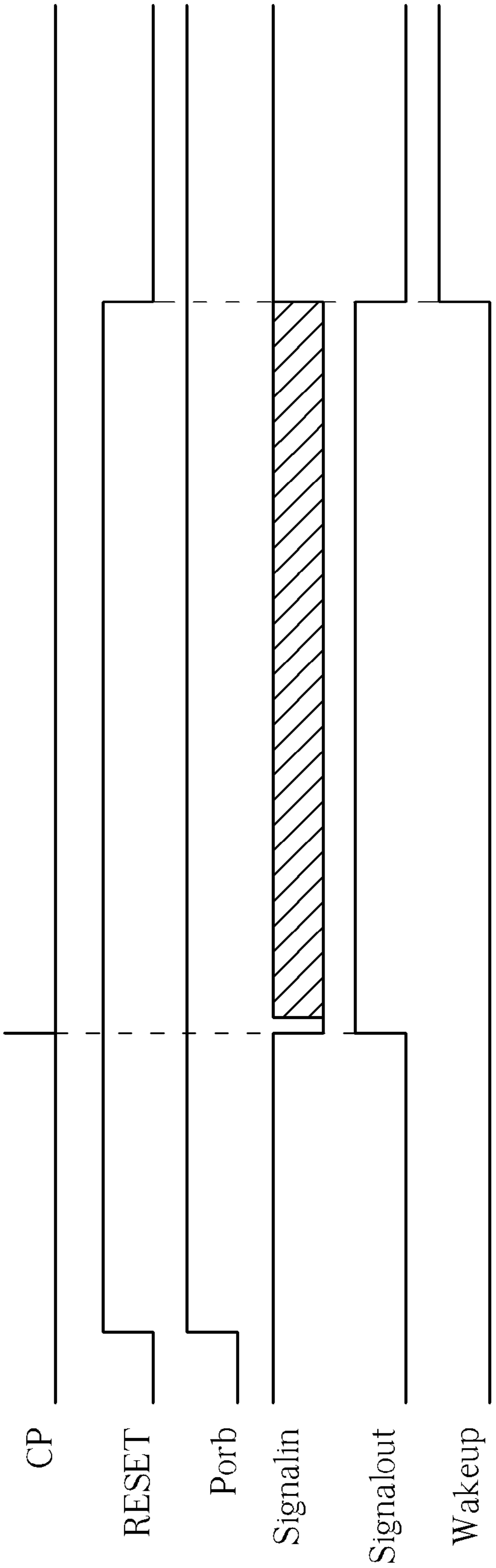
FIG. 4 illustrates a schematic waveform diagram related to the startup module shown in FIG. 3.

Please refer to FIG. 3 and FIG. 4. FIG. 3 illustrates a detailed diagram of the startup module 300 shown in FIG. 2 according to a preferred embodiment of the present invention. FIG. 4 illustrates a schematic waveform diagram related to the startup module 300 shown in FIG. 3. As shown in FIG. 3, the startup module 300 includes a first OR logic gate, an Exclusive-OR(XOR) logic gate 320, a D flip-flop 330, and a second OR logic gate 340. The first OR logic gate 310 has a first input terminal coupled to a signal input terminal Signalin. The XOR logic gate 320 has a first input terminal coupled to an output terminal of the first OR logic gate 310. The D flip-flop 330 has a clock input terminal CP coupled to an output terminal of the XOR logic gate 320, and has an output Q coupled to both a signal output terminal Signalout and a second input terminal of the first OR logic gate 310. The second OR logic gate 340 has a positive input terminal coupled to a first trigger signal terminal Wakeup and a second input terminal of the XOR logic gate 320, has a negative input terminal coupled to a second trigger signal terminal Porb, and has an output terminal coupled to a reset terminal RESET of the D flip-flop 330, where the reset terminal RESET is triggered by falling edge. The second trigger signal terminal Porb is enabled once, while the EPD IC 100 leaves a shutdown mode and enters the normal mode. The first trigger terminal Wakeup indicates a wakeup signal issued externally from the EPD IC 100, where the first trigger terminal Wakeup is triggered by a rising edge. The first trigger signal terminal Wakeup is enabled once, while the EPD IC 100 leaves the sleep mode and enters the normal mode. The D flip-flop 330 has an input terminal D coupled to an enable signal source En, which continuously stays at an enable state so that the input terminal D is kept at a high voltage level.

In FIG. 4, at the beginning, the EPD IC is supposed to stay at a reset state, so that the EPD IC begins to reset related signals. As shown in FIG. 4, except for the signal input terminal, which stays at a high voltage level, other terminals including the clock input terminal CP, the reset terminal RESET, the first trigger signal terminal Wakeup, the second trigger signal terminal Porb, and the signal output terminal Signalout stay at a low voltage level. Suppose that the switches 252, 254, and 256 are switched on while the signal output terminal Signalout is at a low voltage level, whereas the switches 252, 254, and 256 are switched off while the signal output terminal Signalout is at a high voltage level; therefore, in a preferred embodiment of the present invention, the switches 252, 254, and 256 are implemented with P-type MOSFETs. Then, while the EPD IC 100 is supplied with power so that the EPD IC 100 has to leave from the reset state and to enter the normal mode, the second trigger signal terminal Porb is changed from a low voltage level to a high voltage level; at the same time, the reset terminal RESET is triggered by an output signal of the second OR logic gate 340 so that the output signal terminal Signalout is kept at a low voltage level; and meanwhile, the digital routine module 210 confirms the fact that the second trigger signal terminal Porb is triggered so that the digital routine module 210 perceives that the EPD IC 100 leaves the reset state and enters the normal mode, and accordingly, the digital routine module 210 loads an initial setting so as to run related programs for activating elements included by the digital routine module 210 and within the EPD IC 100.

After a while, when the voltage level of the signal input terminal Signalin is temporarily changed from a high voltage level to a low voltage level, it indicates that the EPD IC 100 attends to enter the sleep mode. The clock input terminal CP is changed to be at a high voltage level by the cooperation of the first OR logic gate 310 and the XOR logic gate 320, and the signal output terminal Signalout is changed to be from a low voltage level to a continuous high voltage level by operations of the D flip-flop 330. At this time, the high voltage level at the signal output terminal Signalout is fed back to the first OR logic gate 310 so that the clock input terminal is changed to be at the low voltage level again. Therefore, while the EPD IC 100 enters the sleep mode, there is merely a short high-voltage impulse at the clock input terminal CP. In other words, even if the voltage level at the signal input terminal Signalin is changed to a floating voltage level since the switches 252, 254, and 256 are switched off, the voltage level at the signal input terminal is isolated from the D flip-flop 330 by both the first OR logic gate 310 and the XOR logic gate 320 so that the voltage level at the signal output terminal Signalout is prevented from being changed again in accordance with the voltage level at the signal input terminal Signalin, where the floating voltage level is indicated by oblique lines shown in FIG. 4.

At last, while the EPD IC 100 leaves the sleep mode and enters the normal mode, the voltage level at the first signal trigger terminal Wakeup is changed from low to high, and the reset terminal RESET is ceased being triggered by operations of the second OR logic gate 340 so that the voltage level at the signal output terminal Signalout is changed from high to low. The D flip-flop 330 re-activates the switches 252, 254, and 256 since the voltage level at the signal output terminal Signalout is changed from high to low, so that the real-time counter module 220, the digital non-routine module 230, and the analog module 120 are switched on so to operate normally. At the same time, the digital routine module 210 confirms that the first trigger terminal Wakeup is triggered, so as to perceive the condition that the EPD IC 100 leaves the sleep mode and enters the normal mode. The digital routine module 210 also adjusts its settings and related parameters, so as to run related programs to activate elements of the EPD IC 100 included by the digital routine module 210. The second signal trigger terminal Porb is merely triggered at the first time when the EPD IC 100 is activated, so as to have the EPD IC 100 leave the shutdown state and enter the normal mode. Hereafter, each time when the EPD IC 100 re-enters the sleep mode, the voltage level at the first signal trigger terminal Wakeup is changed from high to low, so that the EPD IC 100 leaves the sleep mode and enters the normal mode again after the voltage level at the first signal trigger terminal Wakeup is changed from low to high again.

With the aid of the operations of the control module 200, most unnecessarily-activated elements within the digital mode or the analog module of the EPD IC 100 may be switched off, so as to reduce power consumption under the sleep mode.

Figure 5:
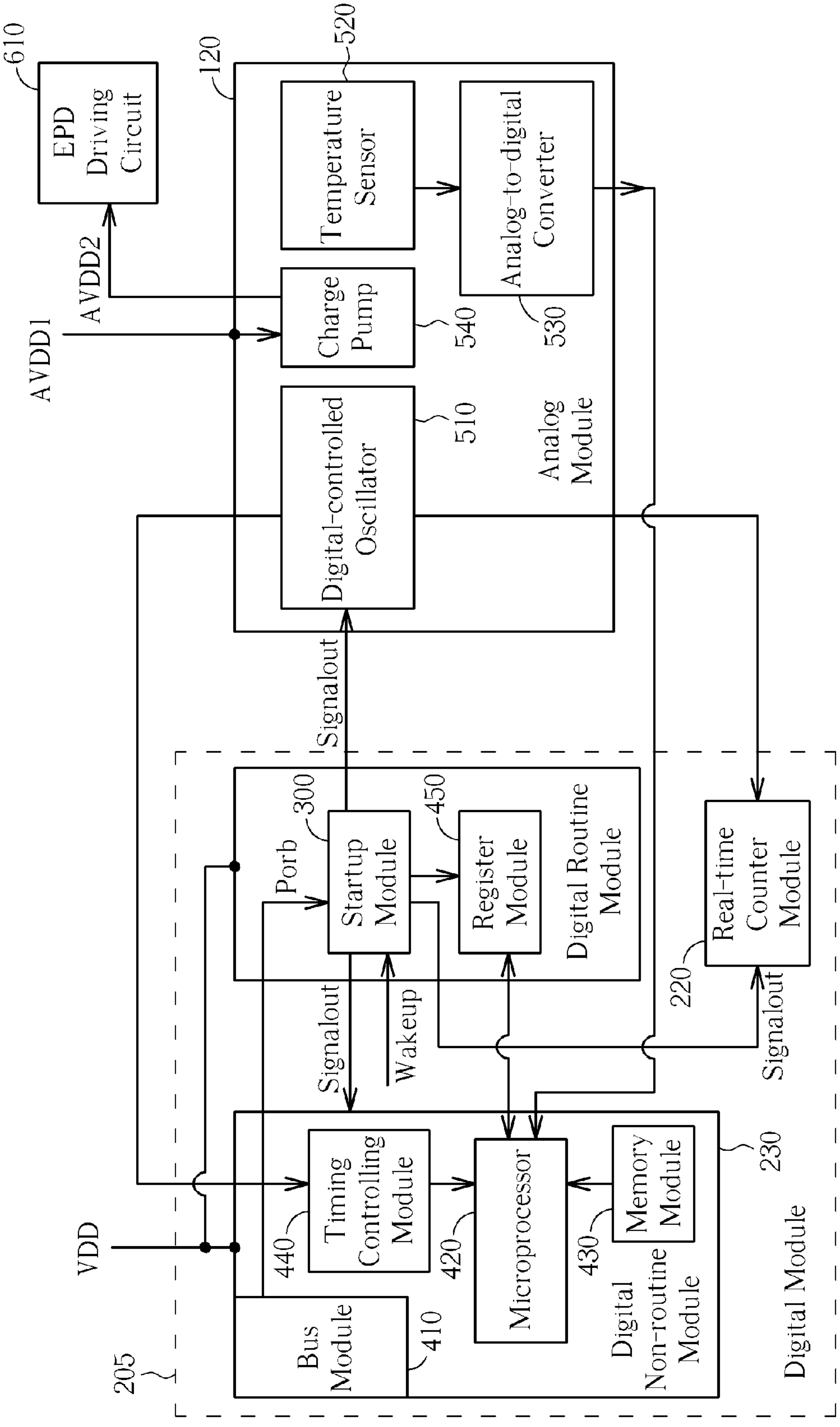
FIG. 5 illustrates using the digital routine module, the real-time counter module, the digital non-routine module, and the analog module shown in FIG. 2 on operations of the EPD IC shown in FIG. 1 in detail.

Please refer to FIG. 5, which illustrates using the digital routine module 210, the real-time counter module 220, the digital non-routine module 230, and the analog module 120 shown in FIG. 2 on operations of the EPD IC 100 in detail, where the digital routine module 210, the real-time counter module 220, the digital non-routine module 230 are included by a digital module 205, which corresponds to the digital module 105 shown in FIG. 1. As shown in FIG. 5, the digital routine module 210 includes the startup module 300 shown in FIGS. 2-3 and a register module 450. The register module 450 is used for storing required information for activating the EPD IC 100 by the digital routine module 210, so that the digital routine module 210 is capable of cooperating with the startup module 300 to precisely and rapidly activate the EPD IC 100 by loading the stored required information from the register module 450, while the EPD IC 100 tends to leave the sleep mode and enter the normal mode. The digital non-routine module 230 includes a bus module 410, a microprocessor 420, a memory module 430, and a timing control module 440. The bus module 410 is used for exchanging information with an external environment. As described in accordance with FIG. 3, the second trigger signal terminal Porb is merely enabled once at the first time when the EPD IC 100 is activated, and a voltage level at the second trigger signal terminal Porb is transmitted to the startup module 300. The microprocessor 420 is used for processing calculations of the EPD IC 100 with the aid of the memory module 430, which serves as buffers in the processed calculations. The timing control module 440 is used for providing a system clock required by the microprocessor 420. The analog module 120 includes a temperature sensor 520, an analog-to-digital converter 530, a charge pump 540, and a digital-controlled oscillator phase-locked loop 510. The digital-controlled oscillator phase-locked loop 510 is used for generating the system clock to both the timing control module 440 and the real-time counter module 220, so that the timing control module 440 is capable of providing the system clock to the microprocessor 420, and so that the real-time counter module 220 is capable of performing a real-time counting procedure according to the system clock. The temperature sensor 520 is used for generating a temperature signal. The analog-to-digital converter 530 is used for transforming the temperature signal into a digital signal and for transmitting the digital signal to the microprocessor 420, so that the microprocessor 420 determines how to activate the EPD IC 100 according to variations in a surrounding temperature. The charge pump 540 is used for transforming the second DC source AVDD1 into a drive power source AVDD2, so as to drive an electro-phoretic display (EPD) driving circuit 610 included by the EPD IC 100. The EPD driving circuit 610 is driven by a voltage higher than the second DC source AVDD1, so that the charge pump 540 is required to transforming the second DC source AVDD1, which has a lower voltage level, into the drive power source AVDD2, which has a higher voltage level. Conventionally, the voltage level of the second DC source AVDD1 may be ranged from 2.2 volts to 3.6 volts, whereas the voltage level of the drive power source AVDD2 may be ranged from 30 volts to 40 volts.

Figure 6:
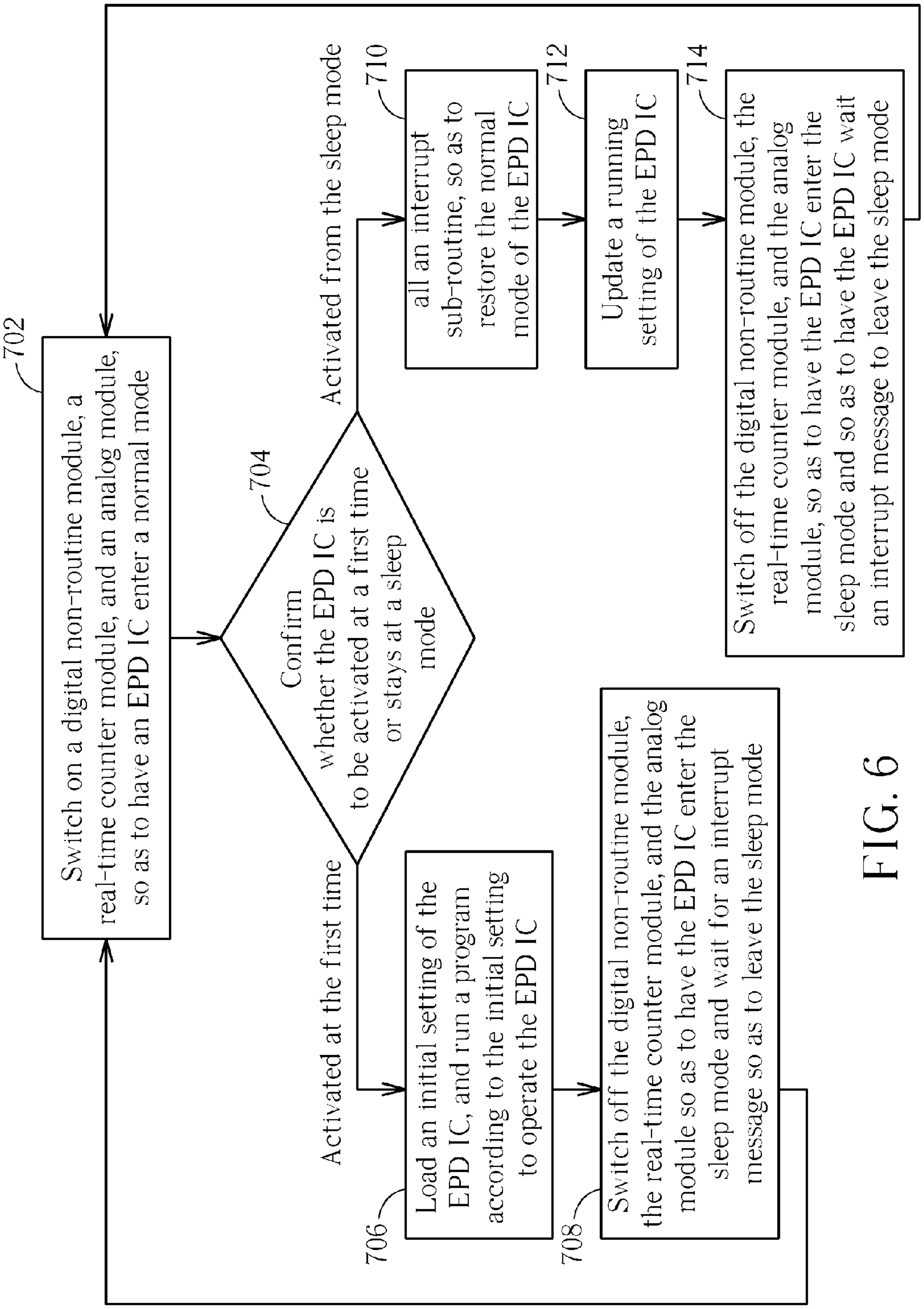
FIG. 6 is a schematic flowchart of controlling an EPD IC by the control module shown in FIGS. 2-5 according to an embodiment of the present invention.

Please refer to FIG. 6, which is a schematic flowchart of controlling an EPD IC by the control module 200 shown in FIGS. 2-5 according to an embodiment of the present invention. As shown in FIG. 6, the method includes:

Step 702: Switch on a digital non-routine module, a real-time counter module, and an analog module, so as to have an EPD IC enter a normal mode;

Step 704: Confirm whether the EPD IC is to be activated at a first time or stays at a sleep mode, i.e., be activated at a second time or later, before entering the normal mode; while the EPD IC is to be activated at the first time, go to Step 706; while the EPD IC stays at the sleep mode, go to Step 710;

Step 706: Load an initial setting of the EPD IC, and run a program according to the initial setting to operate the EPD IC;

Step 708: Switch off the digital non-routine module, the real-time counter module, and the analog module so as to have the EPD IC enter the sleep mode and wait for an interrupt message so as to leave the sleep mode, and go to Step 702;

Step 710: Call an interrupt sub-routine, so as to restore the normal mode of the EPD IC;

Step 712: Update a running setting of the EPD IC; and

Step 714: Switch off the digital non-routine module, the real-time counter module, and the analog module, so as to have the EPD IC enter the sleep mode and so as to have the EPD IC wait an interrupt message to leave the sleep mode, and go to Step 702.

In Step 704, the condition that the EPD IC is to be activated at a first time (i.e., the condition that the second trigger signal terminal Porb is enabled) or stays at a sleep mode is confirmed by confirming whether the second trigger signal terminal Porb is at a high voltage level. When the second trigger signal terminal Porb is at a high voltage level, the fact that the EPD IC 100 is to be activated at the first time and is going to enter the normal mode, is confirmed; else, the fact that the EPD IC 100 leaves the sleep mode and enters the normal mode, is confirmed instead.

In Step 706, the initial setting, the program related to the initial setting, and the interrupt sub-routine mentioned in Step 710, are all loaded by the memory module 430 shown in FIG. 5. Besides, in Step 708 and Step 714, the act that the EPD IC 100 enters the sleep mode, may be regarded as an interrupt procedure, which may be the interrupt sub-routine mentioned in Step 710; and required information related to the interrupt procedure is buffered in the memory module 430, so that when the EPD IC 100 leaves the sleep mode and enters the normal mode after a while, afore-interrupted operations of the EPD IC 100 may be restored back by loading the interrupt sub-routine in Step 710. Besides, the interrupt messages mentioned in Step 708 and Step 714 indicate the condition that the voltage level at the second trigger signal terminal Porb or the first trigger signal terminal Wakeup is changed from low to high, such as being triggered.

In summary, Step 706 and Step 708 correspond to the condition that the second trigger signal terminal Porb is triggered so that the EPD IC 100 leaves the shutdown mode, i.e., the EPD IC 100 will be activated at the first time, and enters the normal mode; whereas Step 710, Step 712, and Step 714 indicate the condition that the first trigger signal terminal Wakeup is triggered so that the EPD IC 100 leaves the sleep mode and re-enters the normal node, i.e., the EPD IC 100 will be activated at a second time or later. Embodiments generated by feasible combinations and/or permutations of steps shown in FIG. 6, and embodiments generated by combining the above-mentioned restrictions into the steps shown in FIG. 6, should also be regarded as embodiments of the present invention.

The present invention discloses a control module and a method thereof for controlling activate statuses of elements within an EPD IC under its sleep mode, so as to reduce power consumption under the sleep mode. With the aid of the control module and the method thereof in the present invention, most elements un-required to be switched on under the sleep mode may be switched off without introducing any adjustment on the composition of the EPD IC, besides, merely part of elements of the EPD IC are switched on under the sleep mode, for preparing re-starting the EPD IC while leaving the sleep mode and entering the normal mode. Therefore, without increasing design complexity and/or circuit area of the EPD IC, power consumption may be reduced, and a usage time of an integrated circuit card utilizing the EPD IC may be lengthened as a result.

Those skilled in the art will readily observe that numerous modifications and alterations of the device and method may be made while retaining the teachings of the invention.

What is claimed is:

1. A control module for controlling an electro-phoretic display integrated circuit (EPD IC), comprising:

a digital routine module, for operating a plurality of digital routine modules of an EPD IC;

a digital non-routine module, for operating a plurality of digital non-routine modules of the EPD IC;

an analog module, for operating a plurality of analog modules of the EPD IC; and a switch module, for determining whether to switch off the digital routine module or the analog module according to whether a sleep mode of the EPD IC is activated.

2. The control module of claim 1, wherein the switch module comprises:

a first switch, for determining whether to switch of the digital non-routine module according to whether the sleep mode is activated; and a second switch, for determining whether to switch off the analog module according to whether the sleep mode is activated.

3. The control module of claim 2, wherein when the sleep mode is activated, the first switch and the second switch are switched off simultaneously, for switching off both the digital non-routine module and the analog module at a same time.

4. The control module of claim 1, further comprising:

a real-time counting module, for activating a real-time counting procedure of the EPD IC according to an enable signal generated by the digital routine module.

5. The control module of claim 4, wherein the switch module further comprises a third switch for determining whether to switch on the real-time counting module according to the enable signal.

6. The control module of claim 1 wherein the digital routine module comprises:

a first OR logic gate having a first input terminal coupled to a signal input terminal;

an Exclusive-OR logic gate having a first input terminal coupled to an output terminal of the first OR logic gate; and a D flip-flop having a clock input terminal coupled to an output terminal of the Exclusive-OR logic gate, and having an output terminal coupled to a signal output terminal and a second input terminal of the first OR logic gate; and a second OR logic gate having a positive input terminal coupled to a first trigger terminal and a second input terminal of the Exclusive-OR logic gate, having a negative input terminal coupled to a second trigger terminal, and having an output terminal coupled to a reset terminal of the D flip-flop;

wherein the reset terminal of the D flip-flop is falling-edge-triggered.

7. The control module of claim 6, wherein an input terminal of the D flip-flop is coupled to an enable signal source.

8. The control module of claim 6 wherein the digital routine module further comprises a register module for storing necessary information of the digital routine module while activating the EPD IC, so as to have the EPD IC be activated according to the necessary information while the EPD IC exits the sleep mode and enters a normal mode.

9. The control module of claim 6, wherein the digital non-routine module comprises:

a microprocessor for handling a calculation procedure of the EPD IC;

a timing control module for providing a system clock to the microprocessor;

a memory module for serving as a buffer of the microprocessor; and a bus module for transmitting information between the digital routine module and an exterior of the control module.

* * * * *